(12) United States Patent
Nagata et al.

(10) Patent No.: US 7,457,799 B2
(45) Date of Patent: Nov. 25, 2008

(54) APPARATUS AND METHOD FOR SEARCHING DATA OF STRUCTURED DOCUMENT

(75) Inventors: Masahiko Nagata, Kawasaki (JP);
Masataka Matsuura, Kawasaki (JP);
Norikazu Isomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 548 days.

(21) Appl. No.: 10/853,908

(22) Filed: May 25, 2004

(65) Prior Publication Data

US 2005/0044070 A1  Feb. 24, 2005

(30) Foreign Application Priority Data

Aug. 20, 2003  (JP) ............................. 2003-296766

(51) Int. Cl.
*G06F 7/00* (2006.01)
*G06F 17/00* (2006.01)
*G06F 17/30* (2006.01)

(52) U.S. Cl. ................................. 707/3; 707/2; 707/100
(58) Field of Classification Search .................... 707/10, 707/2, 3, 101, 100
See application file for complete search history.

(56) References Cited

U.S. PATENT DOCUMENTS

| 2002/0004819 A1* | 1/2002 | Agassy et al. ............... 709/203 |
| 2003/0018668 A1* | 1/2003 | Britton et al. ............... 707/513 |
| 2006/0004780 A1* | 1/2006 | Maeda et al. ............... 707/10 |

FOREIGN PATENT DOCUMENTS

| JP | 2000-90091   | 3/2000 |
| KR | 2001-0109665 | 12/2001 |

OTHER PUBLICATIONS

Feng Peng et al., XPath Queries on Streaming Data, Jun. 9-12, 2003, ACM, all.*
W3C XML Path Language (XPATH) Version 1.0—www.w3.org/TR/1999/REC-xpath-19991116.*
Green, Miklau, Onizuka, Suciu: "Processing XML Streams with Deterministic Automata" Technical Report, University of Washington, [On-line] 2001, XP002376152, Washington, USA.
Peng F, Chawathe S S: "XPath Queries on Streaming Data" SIGMOD 2003, [On-line], Jun. 9, 2003, pp. 1-12, XP002376243, San Diego, CA, USA.
Altinel M. et al. "Efficient Filtering of XML Documents for Selective Dissemination of Information" Proceedings of the International Conference on Very Large Data Bases, Sep. 10, 2000, pp. 1-12, XP002181785.

* cited by examiner

*Primary Examiner*—Mohammad Ali
*Assistant Examiner*—Patrick A Darno
(74) *Attorney, Agent, or Firm*—Greer, Burns & Crain, Ltd.

(57) ABSTRACT

Tag registration information, keyword registration information, and state management information are generated based on a search condition, and a tag search of detecting a tag registered in the tag registration information from document data of a structured document is switched to and from a keyword search of detecting a keyword registered in the keyword registration information according to the state management information.

7 Claims, 25 Drawing Sheets

DOCUMENT 1

```
<doc>
    <head>
        <id>0001</id>
        <nm>Taro</nm>
    </head>
    <Grp>
        <A>X</A>
        <B>1000</B>
    </Grp>
    <Grp>
        <A>Y</A>
        <B>2000</B>
    </Grp>
</doc>
```

DOCUMENT 2

```
<doc>
    <head>
        <id>0002</id>
        <nm>Hanako</nm>
    </head>
    <Grp>
        <A>Z</A>
        <B>3000</B>
    </Grp>
</doc>
```

FIG. 1A

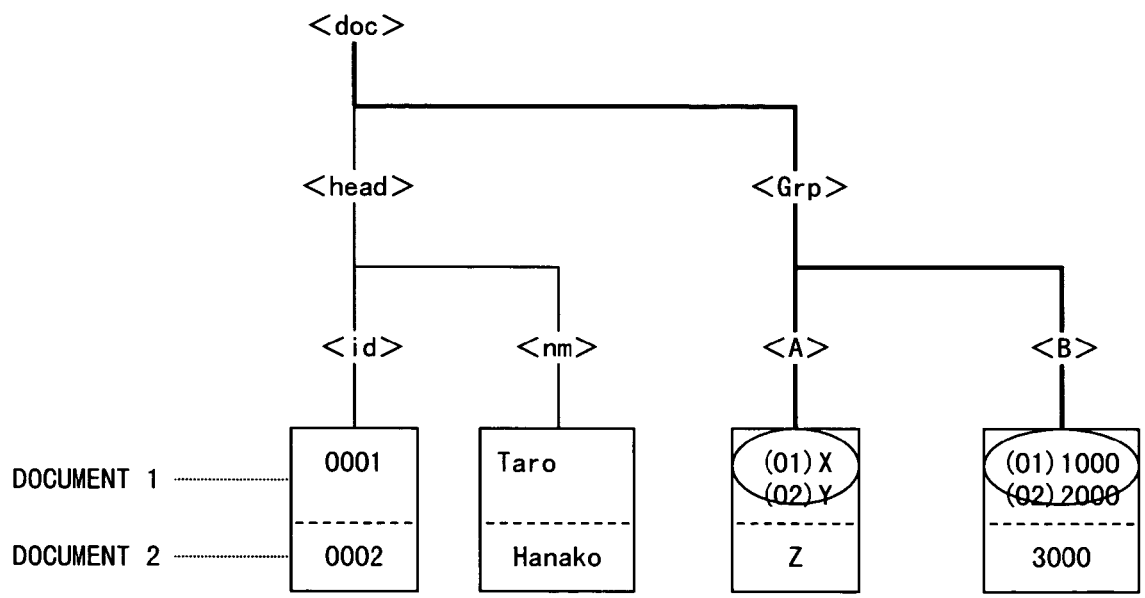
F I G. 1 C

| <doc> | <head> | | <Grp> | |
| --- | --- | --- | --- | --- |
| | <id> | <nm> | <A> | <B> |
| DOCUMENT 1 | 0001 | Taro | X | 1000 |
| DOCUMENT 1 | 0001 | Taro | Y | 2000 |
| DOCUMENT 2 | 0002 | Hanako | Z | 3000 |

FIG. 1D

| <doc> | <head> | | <Grp> | |
|---|---|---|---|---|
| | <id> | <nm> | <A> | <B> |
| DOCUMENT 1 | 0001 | Taro | X | 1000 |
| DOCUMENT 1 | 0001 | Taro | Y | 2000 |
| DOCUMENT 2 | 0002 | Hanako | Z | 3000 |

F I G. 1 E

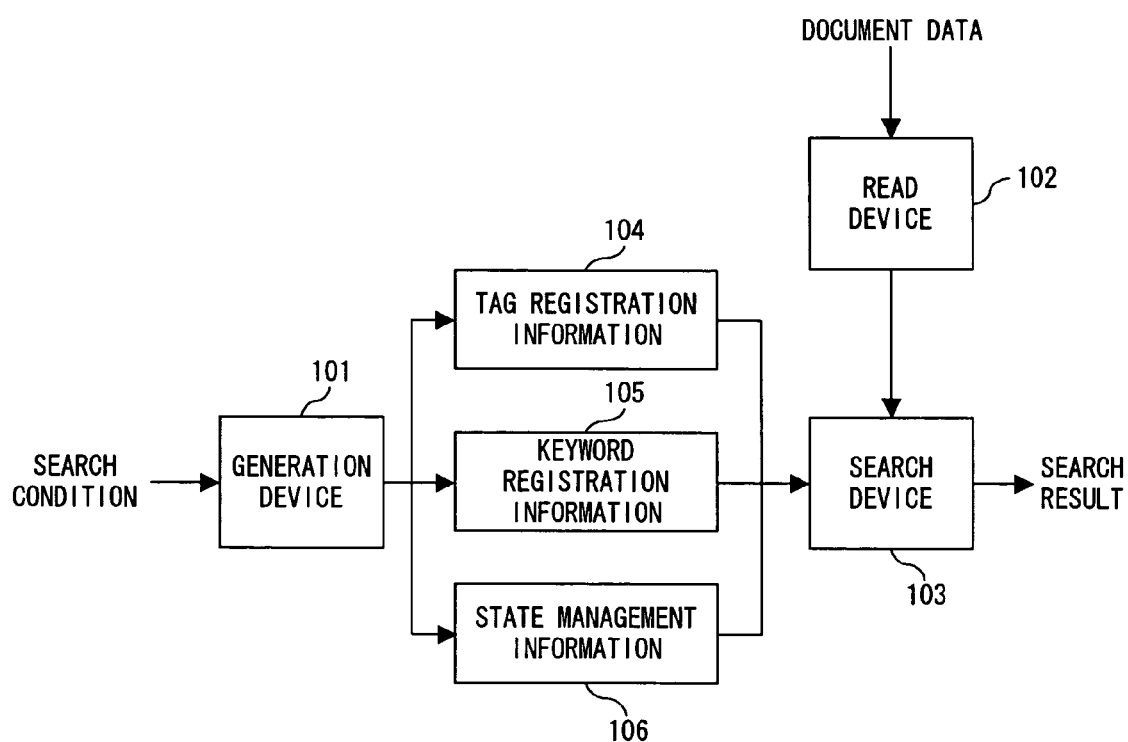
F I G. 2

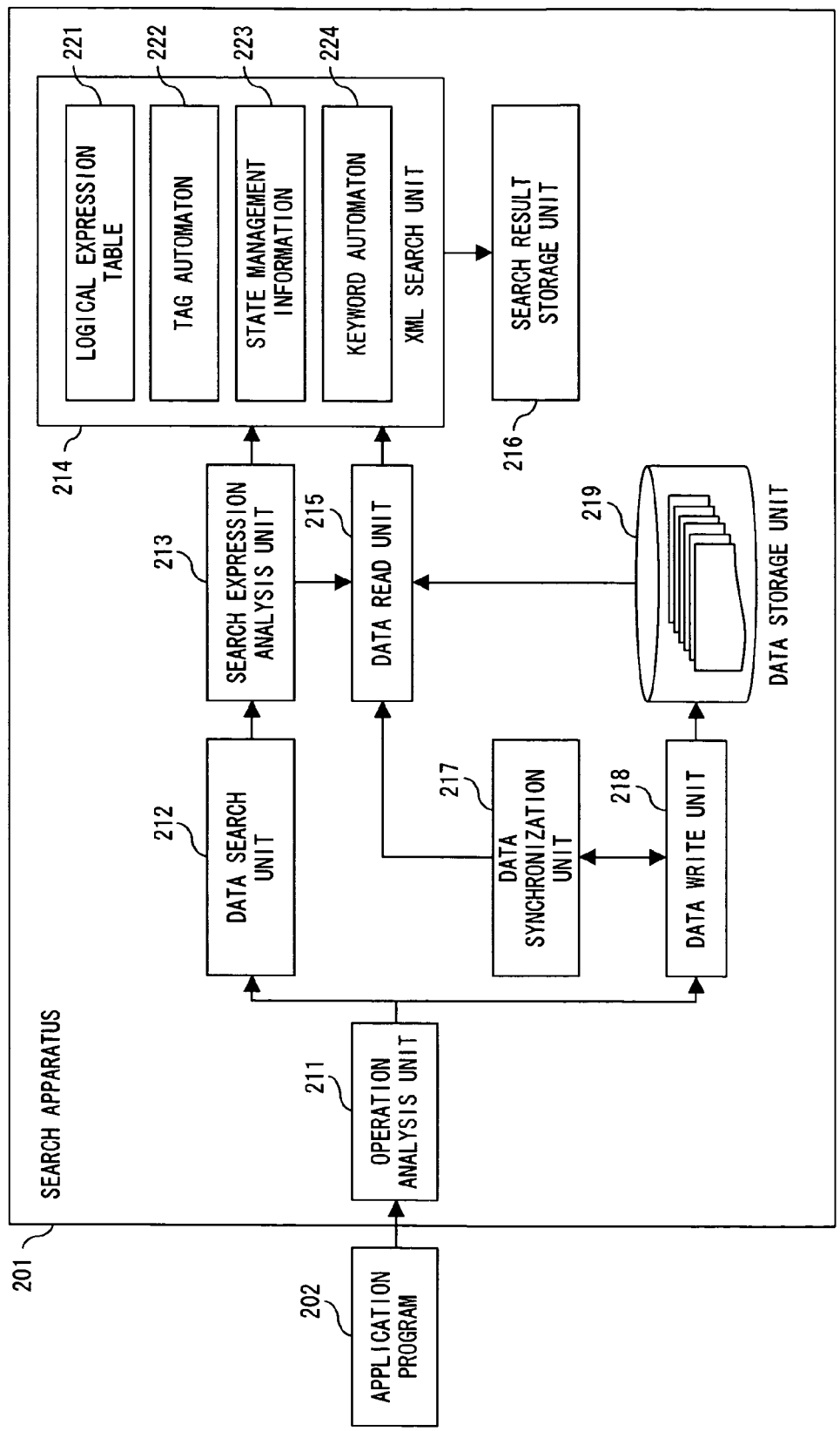
F I G. 3

```
<root>
        <comp>
                <code>00001</code>
                <name>ABC COMPANY</name>
                <syain>
                        <id>1000</id>
                        <name>Tanaka Taro</name>
                </syain>
                <syain>
                        <id>1001</id>
                        <name>Suzuki Jiro</name>
                </syain>
        </comp>
</root>
```

FIG. 4A

```
<root>
        <comp>
                <code>00002</code>
                <name>XYZ COMPANY</name>
                <syain>
                        <id>2000</id>
                        <name>Honda Saburo</name>
                </syain>
                <syain>
                        <id>2001</id>
                        <name>Kawasaki Siro</name>
                </syain>
                <syain>
                        <id>2002</id>
                        <name>Yamada Taro</name>
                </syain>
        </comp>
</root>
```

F I G. 4 B

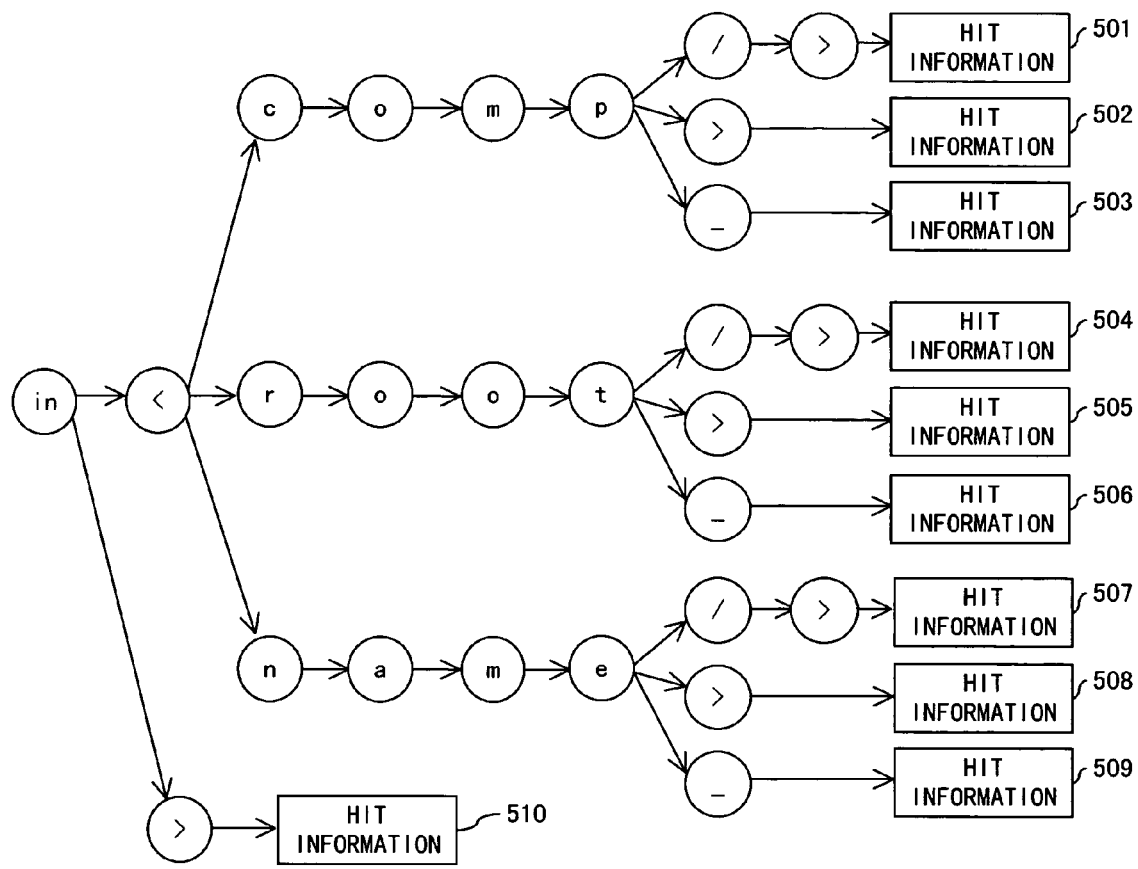
F I G. 5

| CHARACTER STRING | EXPLANATION |
| --- | --- |
| </ | START OF END TAG |
| <! | START OF INTRA-DTD ELEMENT DECLARATION |
| <!— | START OF COMMENT |
| <![CDATA[ | START OF CDATA SECTION |
| <!DOCTYPE | START OF DECLARATION DTD |
| <? | START OF PROCESS INSTRUCTION |
| > | END OF ELEMENT NAME, ATTRIBUTE INDICATION |
| /> | END OF BLANK ELEMENT |
| —> | END OF COMMENT |
| ]> | END OF DTD DECLARATION |
| ]]> | END OF CDATA SECTION |
| ?> | END OF PROCESS INSTRUCTION |

F I G. 6

|   | TAG NAME |
|---|---|
| 1 | root |
| 2 | comp |
| 3 | name |

FIG. 7

| LOGICAL EXPRESSION | VALUE |
|---|---|
| /root/comp/name | |
| 'ABC' | |
| /root/comp/name= 'ABC' | |

FIG. 10

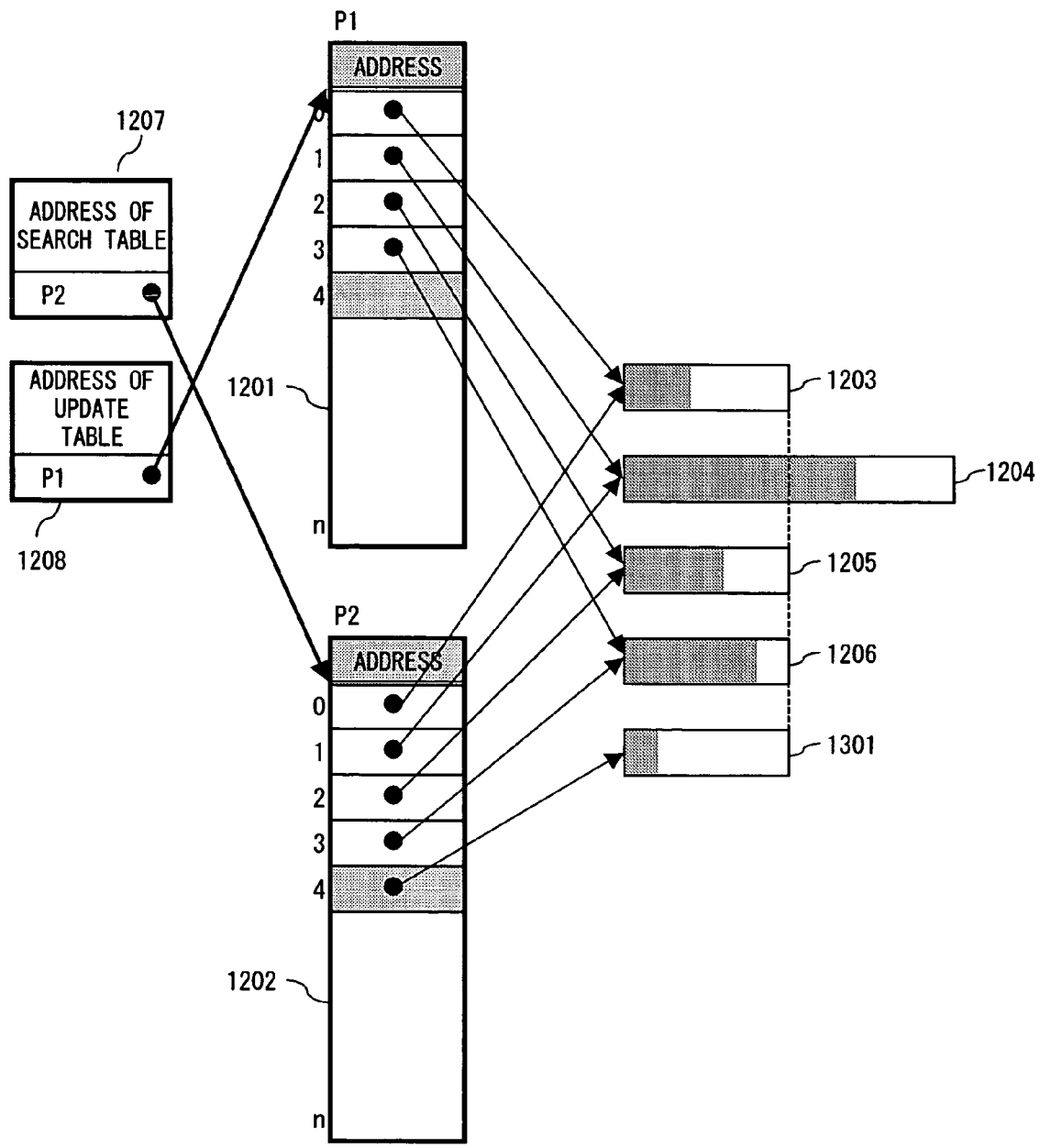
F I G. 1 4

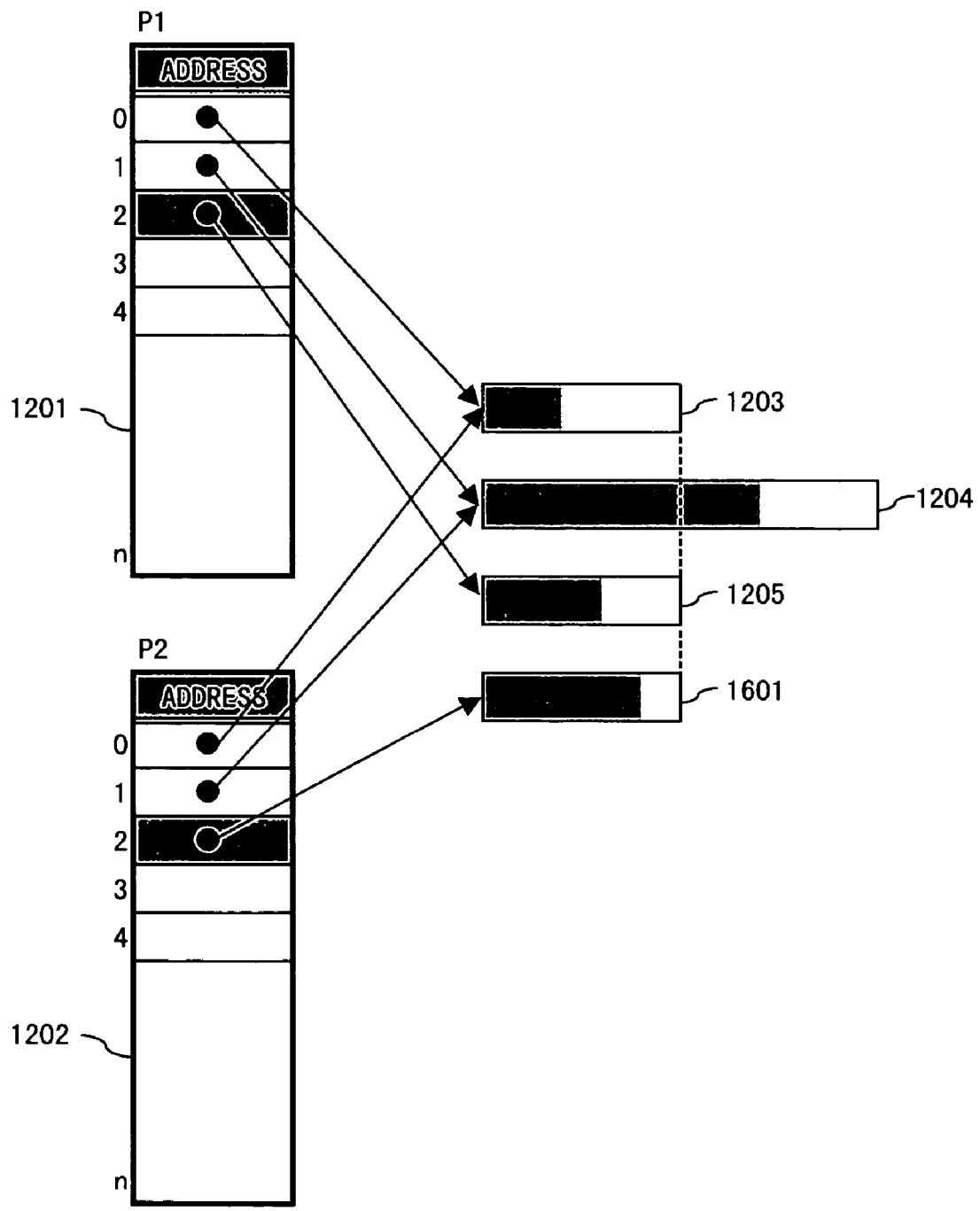
F I G. 1 6

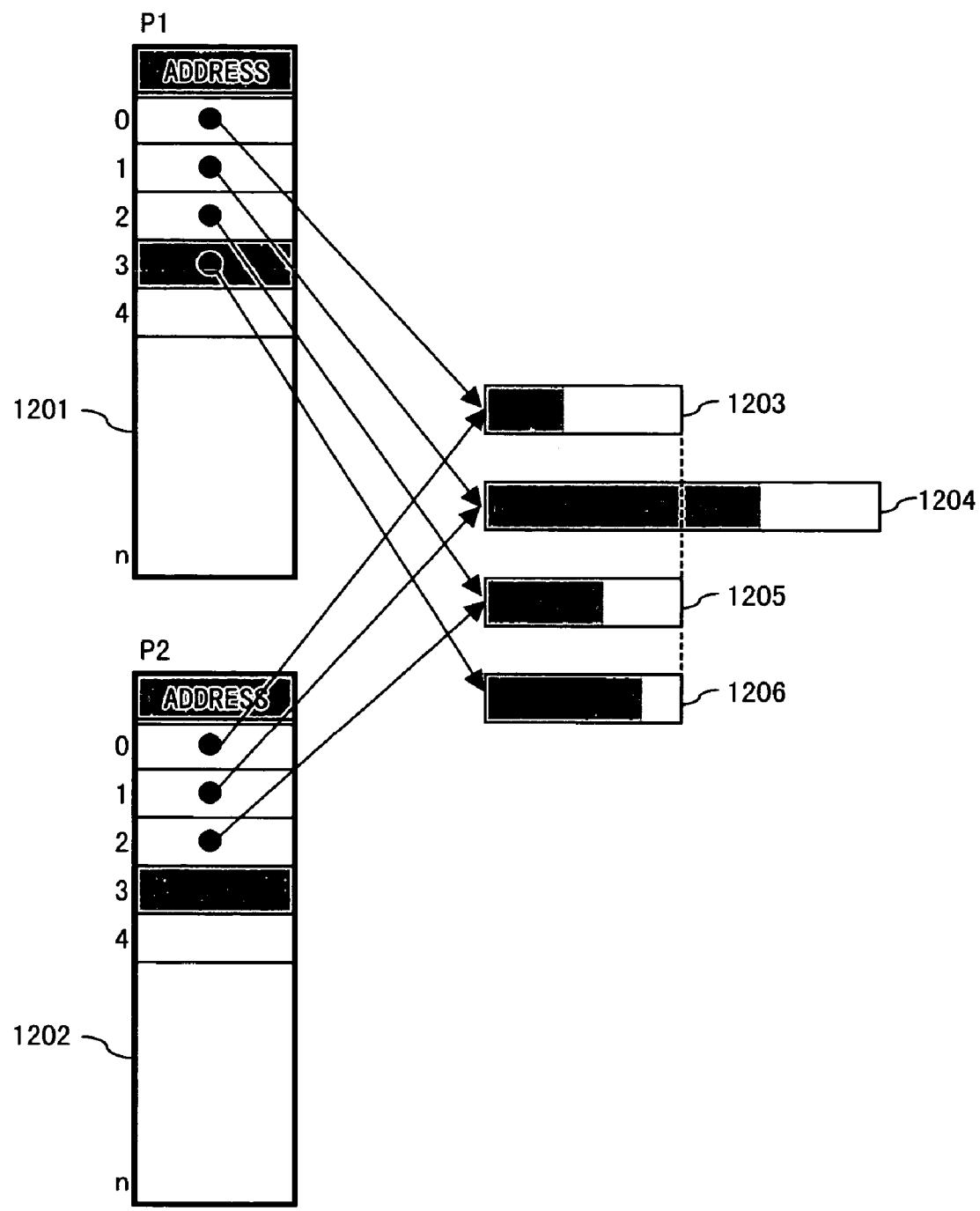
F I G. 1 7

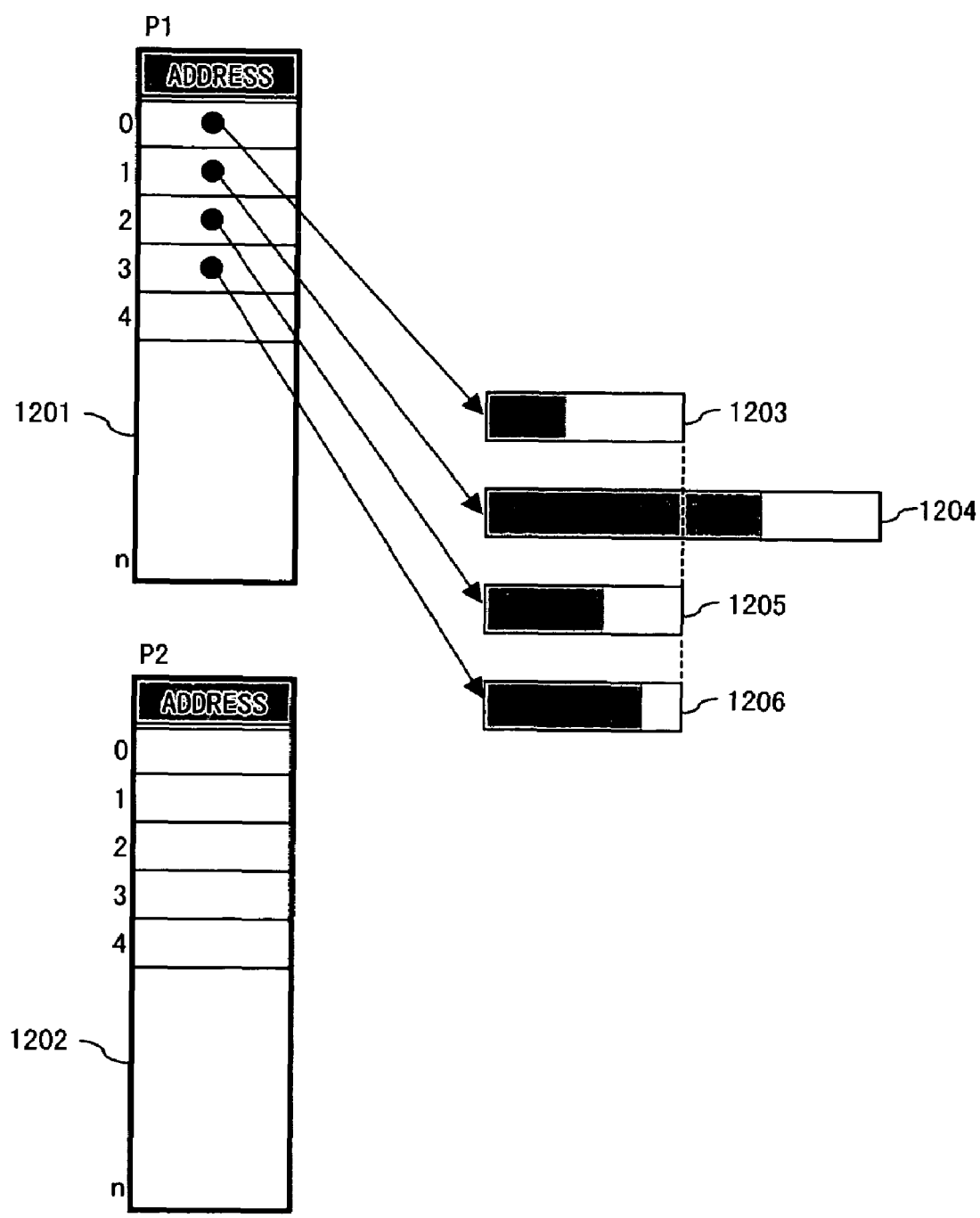
F I G. 1 8

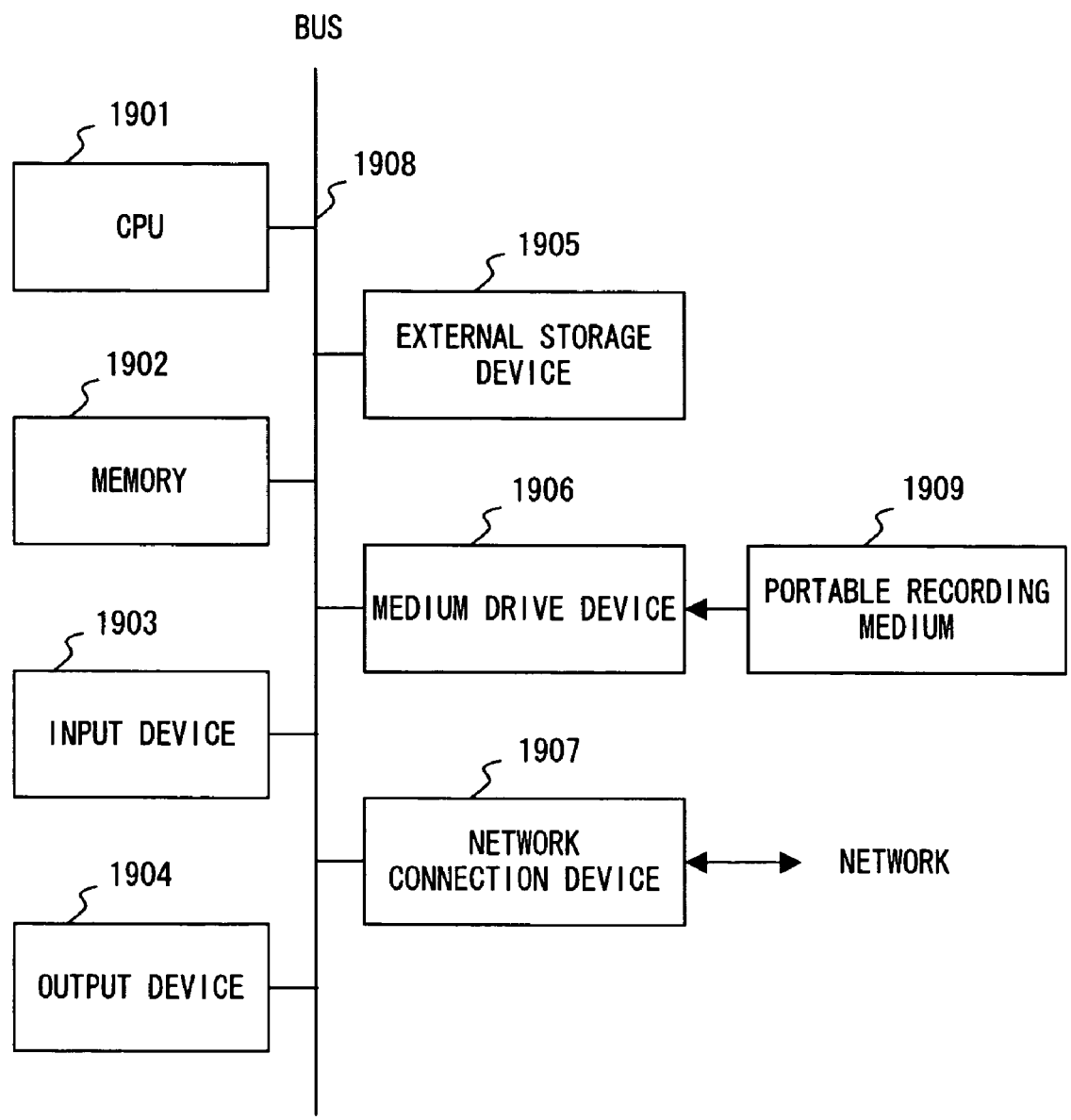
F I G. 1 9

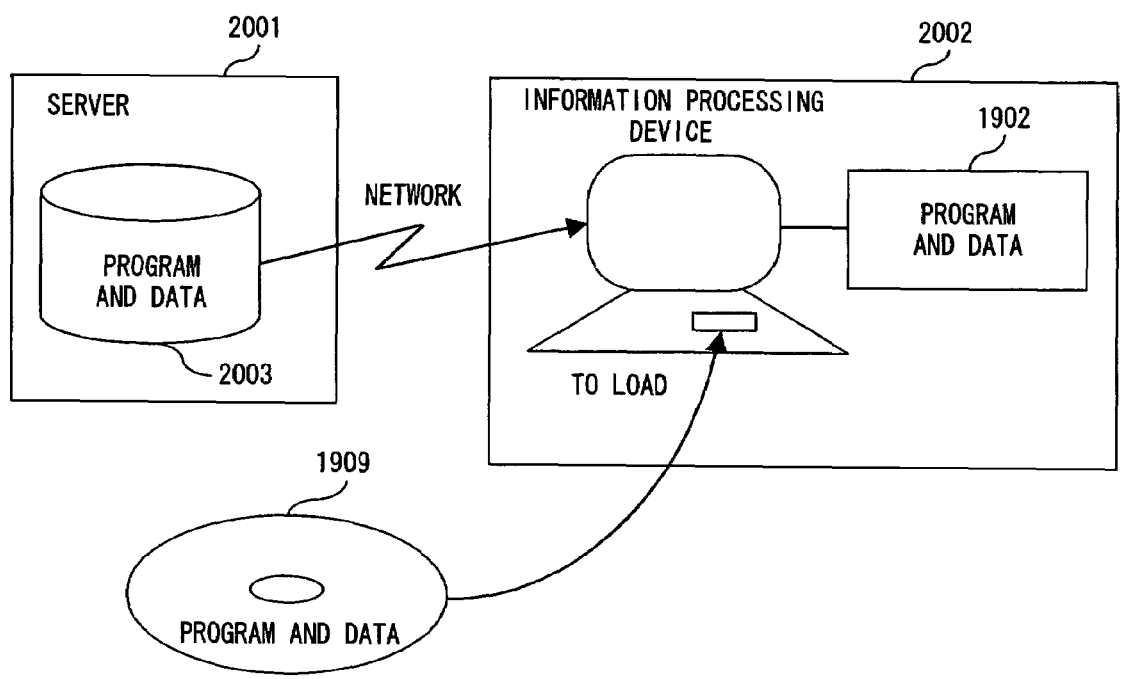
F I G. 20

APPARATUS AND METHOD FOR SEARCHING DATA OF STRUCTURED DOCUMENT

BACKGROUND OF THE INVENTION

1. Field of the Invention

The present invention relates to an apparatus and a method for searching data of a structured document such as an XML (extensible markup language) document, etc.

2. Description of the Related Art

An XML document is a document which is structured by describing each element of document data using a tag, and has a hierarchical structure. When an XML document is represented by a tree structure, each element of the tree is called a node. There are two conventional methods of searching data of an XML document as follows.

(a) A document is expanded by representing all nodes of all documents to be searched by objects of the tree structure. If nodes are searched based on the search request condition, and the condition is satisfied, then the information about a node to be returned is searched for and extracted. This searching method is called an index system.

(b) All documents to be searched are temporarily expanded in a two-dimensional table at a search-return request. At this time, a plurality of nodes which are represented as child nodes of a given node are assigned increased number of table rows as necessary. When the table is searched based on the search request condition and the condition is satisfied, the information about a cell (node) to be returned is extracted.

For example, when two documents as shown in FIG. 1A are to be searched, the document data of the tree structure as shown in FIG. 1B is generated in the method (a) above. It is assumed that the following search expression is input as a search request.

$$/doc/Grp\{/A='X' \text{ AND } /B='1000'\} \quad (1)$$

The search expression represents the condition that the keyword 'X' is contained in the node specified by the path /doc/Grp/A, and the keyword '1000' is contained in the node specified by the path /doc/Grp/B. In this case, by tracing the node of the document data as shown in FIG. 1C, it is indicated that the document 1 satisfies the search request condition.

In the method (b) above, the document data having the table structure as shown in FIG. 1D is generated. In the document 1 shown in FIG. 1A, since there are two different "Grp" nodes as child nodes of the node "doc", the data of the document 1 is stored in two rows in the table shown in FIG. 1D. In this case, as shown in FIG. 1E, a table is searched by the search expression (1), and the document 1 satisfies the search request condition.

In the methods (a) and (b) above, the XML definition information such as a DTD (document type definition), a schema, etc., the information relating to the relationship between the XML definition information and the XML document, and the information relating to each tag and node in the XML document are stored in addition to each XML document to expand in advance all documents to be searched.

In addition, when structured documents are searched, a hierarchical automaton is generated using a search condition as input, and search can be performed using a generated hierarchical automaton (for example, refer to the Patent Literature 1).

Patent Literature 1: Japanese Patent Application Laid-open No. 2000-90091

However, there are the following problems with the above-mentioned conventional searching methods.

Before performing the searching process, a document to be searched is temporarily to be analyzed. Therefore, when a document to be searched is stored, a very long processing time is required to perform processes such as an analyzing process, an expanding process, etc.

Since the document to be searched is divided into tags and nodes for optimization of the search, a storage area of several times that for the original document is required when the document to be searched is stored.

When the document is searched and analyzed, it is necessary that all or a part of stored document data are temporarily expanded in the memory to identify a node satisfying the search request condition. Therefore, depending on the amount of the stored document data, the amount of consumption of the memory resources for search and analysis largely increases.

A group of XML documents to be searched are to be unified in a standardized format specified according to designated XML definition information based on the logic of storage system. Furthermore, when search is performed, a search expression according to a standardized format is to be used. Therefore, when search is performed on a plurality of different-formatted XML documents, it is necessary to merge the obtained search results after searching XML documents in various formats.

SUMMARY OF THE INVENTION

The present invention aims at providing a search apparatus and a method for reducing the processing time, the storage area, and the memory consumption required in storing and searching documents to be searched.

The search apparatus according to the present invention includes a generation device, a read device, and a search device, and searches data of a document structured using a tag based on a search condition.

The generation device analyzes a search condition and generates tag registration information including a registered character string of a tag indicating each element contained in a search path specified by the search condition, keyword registration information including a registered character string of a keyword specified by the search condition, and state management information for management of the current search state using the search path. The read device sequentially reads document data of a structured document to be searched by a predetermined amount.

The search device searches the document data of the structured document and outputs a search result while switching between a tag search of detecting a tag registered in the tag registration information from among the read data string and a keyword search of detecting a keyword registered in the keyword registration information from among the read data string using the state management information.

BRIEF DESCRIPTION OF THE DRAWINGS

FIG. 1A shows documents to be searched;
FIG. 1C shows the first searching method;
FIG. 1D shows document data of a table structure;
FIG. 1E shows the second searching method;
FIG. 2 shows the principle of the search apparatus according to the present invention;
FIG. 3 shows the configuration of the search apparatus;
FIG. 4A shows the first document;
FIG. 4B shows the second document;
FIG. 5 shows a tag automaton;

FIG. 6 shows character strings;
FIG. 7 shows a tag table;
FIG. 10 shows a logical expression table;
FIG. 14 shows the second procedure of an adding process;
FIG. 16 shows an updating process;
FIG. 17 shows a deleting process;
FIG. 18 shows a batch deletion processing;
FIG. 19 shows the configuration of an information processing device;
and
FIG. 20 shows recording media.

PREFERRED EMBODIMENTS OF THE PRESENT INVENTION

Figure 1B:
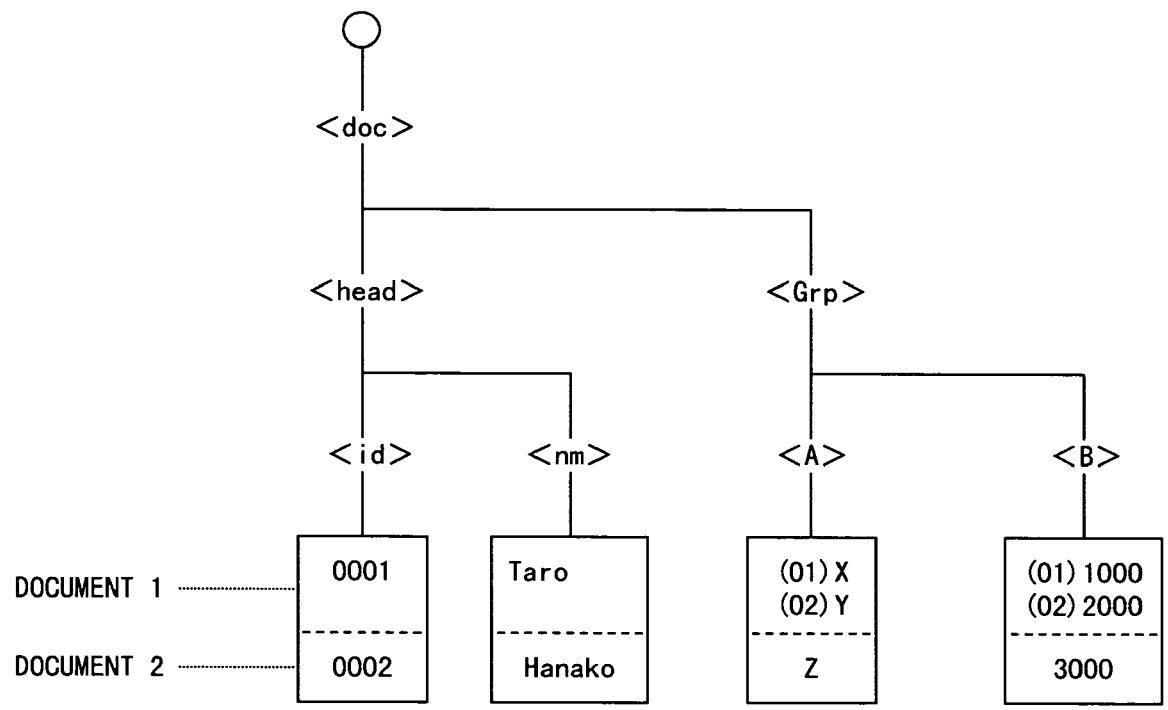
FIG. 1B shows document data of a tree structure.

The preferred embodiments of the present invention are described below by referring to the attached drawings.

FIG. 2 shows the principle of the search apparatus according to the present invention. The search apparatus shown in FIG. 2 comprises a generation device 101, a read device 102, and a search device 103, and searches data of a document structured using a tag based on a search condition.

The generation device 101 analyzes a search condition, and generates tag registration information 104 including a registered character string of a tag indicating each element contained in a search path specified by the search condition, keyword registration information 105 including a registered character string of a keyword specified by the search condition; and state management information 106 for management of the current search state using the search path. The read device 102 sequentially reads document data of a structured document to be searched by a predetermined amount.

The search device 103 searches document data of a structured document and outputs a search result while switching between a tag search of detecting a tag registered in the tag registration information 104 from among the read data string and a keyword search of detecting a keyword registered in the keyword registration information 105 from among the read data string using the state management information 106.

With the above-mentioned search apparatus, search is performed while sequentially reading a predetermined amount of document data. Therefore, it is not necessary to expand document data of all documents to be searched in advance. Furthermore, since search is performed while appropriately switching between the tag search of searching for the tag of the element specified by the search condition and the keyword search of searching for the keyword in the element, the contents of the element satisfying the search condition can be collated with the keyword even if the structure of a document to be searched is not known. Therefore, the document to be searched can be in a format not specified by specific XML definition information, etc.

The generation device 101, the read device 102, the search device 103, the tag registration information 104, the keyword registration information 105, and the state management information 106 respectively correspond to, for example, a search expression analysis unit 213, a data read unit 215, an XML search unit 214, a tag automaton 222, a keyword automaton 224, and state management information 223.

According to the present invention, the document to be searched is not limited to a document in a standardized format, and can be stored as an XML document of a different layout schema. Therefore, the storage area of a document to be searched can be reduced, and the analyzing process is not required, for the document to be searched, thereby increasing the storing speed.

Furthermore, since the consumption of memory resources is not based on the amount of data of the document to be searched, but depends on the amount of data of the search condition, a limited amount of memory resources can be sufficient for the search.

Additionally, even if search is performed using XML documents of different formats, the search can be performed regardless of each format, and the searching speed can be increased.

FIG. 3 shows the configuration of the search apparatus according to an embodiment of the present invention. A search apparatus 201 shown in FIG. 3 comprises an operation analysis unit 211, a data search unit 212, a search expression analysis unit 213, an XML search unit 214, a data read unit 215, a search result storage unit 216, a data synchronization unit 217, a data write unit 218, and a data storage unit 219.

The operation analysis unit 211 receives a process request from an application program 202 of data manipulation, analyzes it to check which the process request demands, the search, addition, update, deletion, or batch deletion of data. If the process request refers to a search request, the search request is transferred to the data search unit 212. If it refers to an addition request, an update request, a deletion request or a batch deletion request, then the process request is transferred to the data write unit 218.

The data search unit 212 transfers the search expression contained in the received search request condition (hereinafter referred to as a search condition) to the search expression analysis unit 213. The search expression analysis unit 213 analyzes the received search expression, and extracts information such as a path specifying an element to be searched for, a tag of each element contained in the path, a keyword to be searched for, etc. Then, according to the extracted information, it generates a tag automaton 222, state management information 223, and a keyword automaton 224, and transfers them to the XML search unit 214. The state management information 223 is the information for management of the search state using the specified path.

An automaton is represented by a set of a plurality of states including an initial state and a acceptance state, and two states are connected by an arrow indicating the direction of the transition. In the initial state, the automaton first determines the state of a transition destination based on the value of the input data, and makes a transition to the state. Then, it determines the state of the transition destination based on the value of the next input data, and makes a transition to the state. In the acceptance state, the information about the data string input from the initial state to the acceptance state is set. That is, the data string is registered in the automaton.

The automaton collates the input data string with the registered data string by repeating the state transition based on the sequentially input data string. When the acceptance state is reached, it determines that the input data string matches the registered data string corresponding to the state, and outputs the information about the registered data string.

The XML search unit 214 has a logical expression table 221, and searches XML documents to be searched stored in the data storage unit 219 using the tag automaton 222, the state management information 223, and the keyword automaton 224 received from the search expression analysis unit 213. At this time, the data read unit 215 reads a predetermined amount of document data of all the documents from the data storage unit 219, and transfers it to the XML search unit 214. When the searching process is started, the value of the logical expression table 221 is set as "false".

The XML search unit 214 inputs the data received from the data read unit 215 to the tag automaton 222, and accesses the state management information 223 according to the hit information output from the tag automaton 222 when the data hits. If the hierarchical level specified by the hit information matches the hierarchical level of the search condition registered in the state management information 223, then the subsequent data is input to the keyword automaton 224. When a keyword registered in the keyword automaton 224 is detected, the information about the corresponding document is stored in the search result storage unit 216.

The tag automaton 222 is formed by the start tag and the end tag of an element. When a start tag and an end tag are detected from input document data, hit information is output. Upon receipt of the information, the XML search unit 214 traces the elements of the state management information 223, and starts inputting document data to the keyword automaton 224 when an element matching the search condition is reached.

The keyword automaton 224 is formed by a keyword of a search condition, a start tag, and an end tag, and outputs hit information when the keyword of the search condition is detected from the input document data. Upon receipt of the information, the XML search unit 214 changes the corresponding value in the logical expression table 221 to "true".

When an end tag is detected from the input document data, the keyword automaton 224 outputs the hit information again. Upon receipt of the information, the XML search unit 214 determines that the searching process has reached a stage of passing through the elements of the search condition, evaluates the logical expression about the element, and initializes the corresponding value in the logical expression table 221. Then, the next element in the state management information 223 is accessed. When an element of a root node is passed through, the final logical expression evaluation is performed and it is determined whether or not the corresponding document is true.

Next, the searching process performed by the search apparatus 201 shown in FIG. 2 is explained below in more details by referring to FIGS. 4A through 11.

FIGS. 4A and 4B show examples of document to be searched and stored in the data storage unit 219. It is assumed that the search expression analysis unit 213 has received the following search expression.

/root/comp/name='ABC'  (2)

The search expression indicates the condition that the keyword 'ABC' is contained in the element specified by the path /root/comp/name. Thus, in the path representation, the symbol "/" is described as the header, and tags of different hierarchical levels are delimited by "/". As indicated by (a) and (b) below, a tag of an element contained in a path can be omitted in the method of describing a search expression.

(a) path representation 1 for short

When a path is described, it can be represented in an abbrev-rated form using "//" replacing a full path. "//" can be used anywhere.

Example 1

/root//comp/name

This representation includes the paths such as "/root/comp/name", "/root/a/b/c/comp/name", etc.

Example 2

//name

This representation includes all paths up to "name" tag.

Example 3

/root/comp//

This representation includes all paths up to a hierarchical level equal to or lower than "/root/comp".

(b) path representation 2 for short

When a path is described, it can be represented with one tag omitted in an abbreviated form using "*" replacing a tag name. "*" can be used anywhere. The portion with "*" can be any tag.

Example 4

/root/comp/*

This representation includes all paths up to a tag corresponding to the portion with "*". Therefore, "root/comp/name" and "/root/comp/code" can be included in this representation.

The search expression analysis unit 213 generates the following three logical expressions from the expression (2) above.

/root/comp/name  (3)

'ABC'  (4)

/root/comp/name='ABC'  (5)

The expression (3) indicates the path designating the element to be searched for, the expression (4) indicates the keyword to be searched for, the expression (5) is a logical expression of combining the expression (3) with the expression (4) using a comparison operator "=". The search expression analysis unit 213 generates the tag automaton 222, the state management information 223, and the keyword automaton 224 from these logical expressions.

FIG. 5 shows an example of a generated tag automaton 222. In FIG. 5, each state is expressed by a circle, and the character in the circle indicates the character data input when the state transition is made from the previous state to the state marked with the character. The state described as "in" indicates the initial state, and the state described with hit information indicates the acceptance state. The following character strings (start tag, etc.) are registered in the automaton. When an input character string matches a registered character string, corresponding hit information is output. However, "_" indicates a blank of a single character

| character string | hit information |
| --- | --- |
| <comp/> | 501 |
| <comp> | 502 |
| <camp_ | 503 |
| <root/> | 504 |
| <root> | 505 |
| <root_ | 506 |
| <name/> | 507 |
| <name> | 508 |
| <name_ | 509 |
| > | 510 |

Although omitted for simplicity in FIG. 5, the character strings as shown in FIG. 6 are also registered in the tag automaton 222. When an automaton is realized by an object oriented programming in a computer, for example, each state and each piece of hit information is represented by one object.

Figure 7:
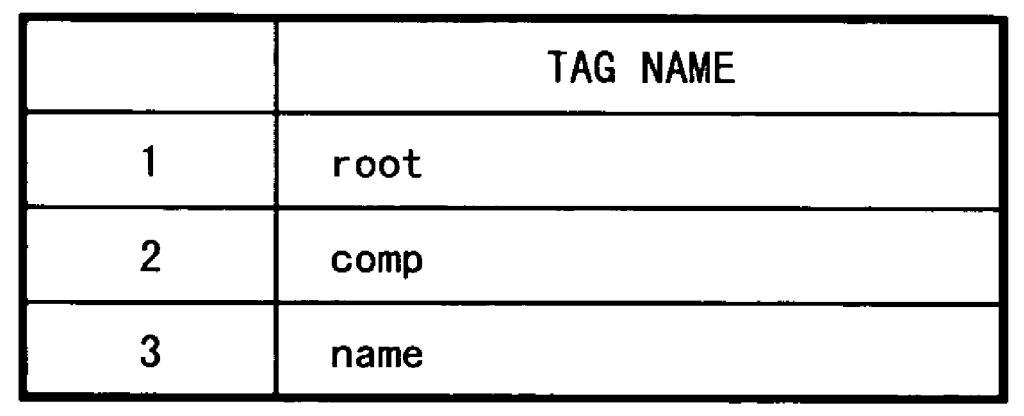

FIG. 7 shows an example of a tag table generated before the state management information 223. In the tag table shown in FIG. 7, the name and the number of each tag contained in the expression (3) are registered. Using the tag table, the state management information as shown in FIG. 8 is generated.

Figure 8:
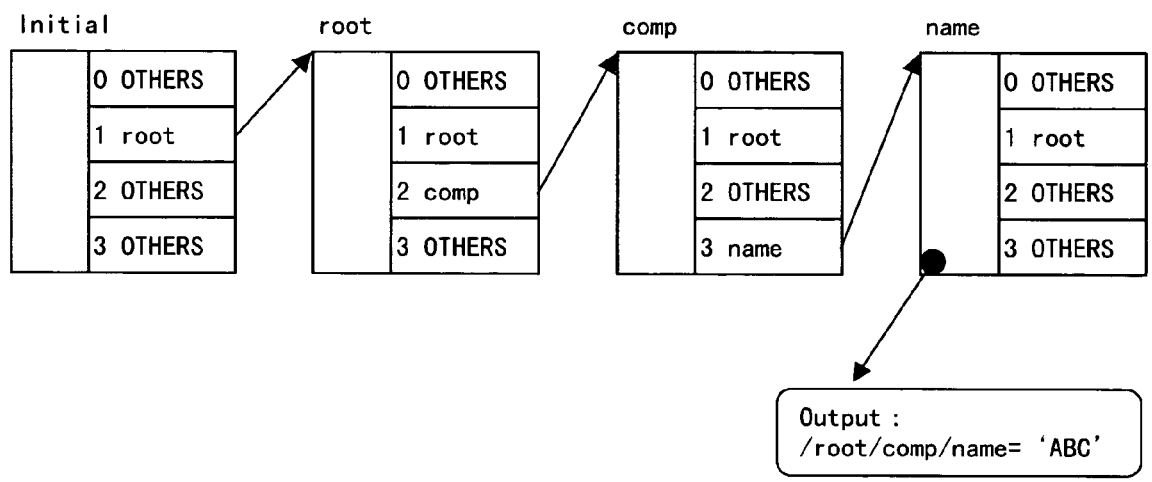
FIG. 8 shows state management information.

The state management information shown in FIG. 8 comprises four elements of "Initial", "root", "comp", and "name", and indicates the path specifying the element to be searched for. The element "Initial" indicates the initial state, and the other three elements respectively correspond to the three elements contained in the paths. The name and the number of a tag registered in the tag table shown in FIG. 7 are registered in each element, and the XML search unit 214 can access the next element according to the information.

"OUTPUT" is added to the element "name" belonging to the hierarchical level of the search condition. The "OUTPUT" includes that the information in the expression (5) is contained, and the expression (5) is evaluated when the element "name" is accessed. When the state management information is described in the object oriented programming, for example, each element and each OUTPUT is represented by one object.

Figure 9:
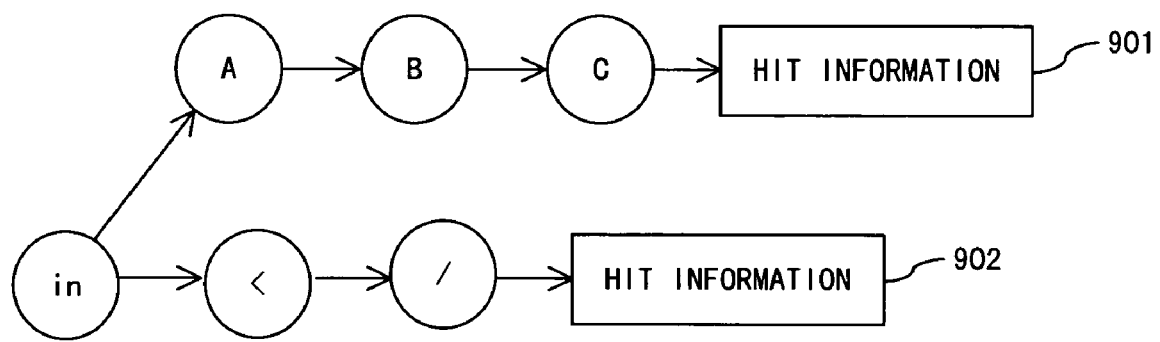
FIG. 9 shows a keyword automaton.

FIG. 9 shows an example of the keyword automaton 224. The method of describing each state and state transition shown in FIG. 9 is basically the same as shown in FIG. 5. The state "in" indicates the initial state, and the state provided with hit information indicates the acceptance state. The following character strings (keyword, etc.) are registered in the automaton, and when a character string matching a registered character string is input, corresponding hit information is output.

| character string | hit information |
|---|---|
| ABC | 901 |
| < / | 902 |

Although omitted for simplicity in FIG. 9, the character strings shown in FIG. 6 are also registered in the keyword automaton 224 actually.

The XML search unit 214 receives the three logical expressions, the tag automaton 222, the state management information 223, and the keyword automaton 224 from the search expression analysis unit 213. As shown in FIG. 10, it registers the received logical expressions in the logical expression table. In the initial state, "false" is stored as a value of each logical expression of the logical expression table.

Figure 11:
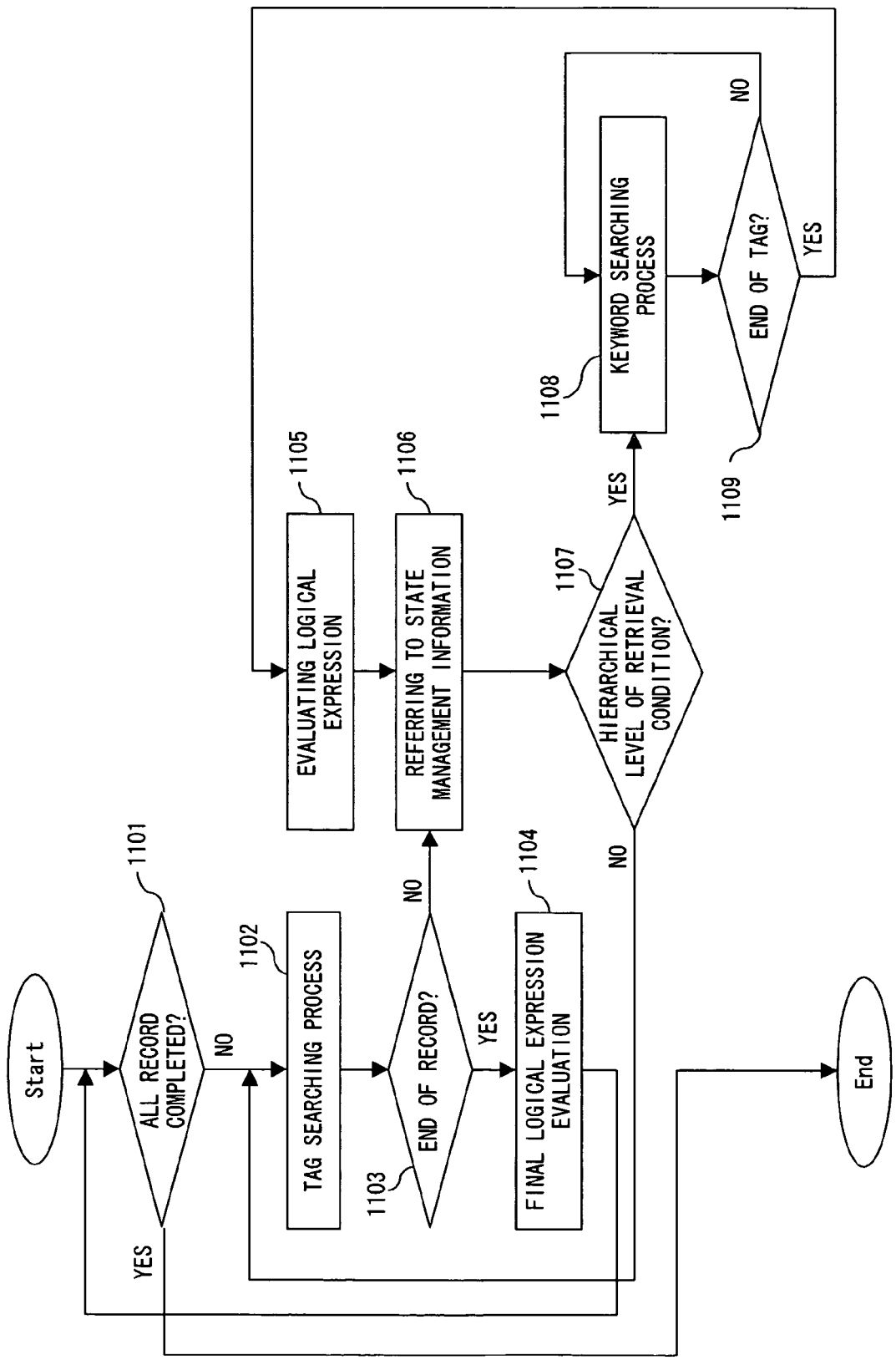
FIG. 11 is a flowchart of a searching process.

Then, the XML search unit 214 performs the searching process according to the flowchart shown in FIG. 11. In the example shown in FIG. 11, it is assumed that each XML document is stored as one record. The XML search unit 214 first checks whether or not the process of all records has been completed (step S1101), and a tag searching process is performed if there is any unprocessed record (step 1102).

In the tag searching process, the document data is input character by character to the tag automaton 222, and when hit information is output from the tag automaton 222, it is checked whether or not the tag of the hit information corresponds to the end of a record (step 1103).

If the tag of the hit information does not correspond to the end of a record, then the state management information 223 is referred to according to the information about the tag (step 1106), and it is checked whether or not the referenced element belongs to the hierarchical level of the search condition (step 1107). If the referenced element belongs to the hierarchical level of the search condition, then a keyword searching process is performed (step 1108).

In the keyword searching process, the subsequent document data is input character by character to the keyword automaton 224, and when hit information is output from the keyword automaton 224, it is checked whether or not a character string of hit information corresponds to the end of the tag (step 1109).

If the character string does not correspond to the end of the tag, then the keyword searching process in step 1108 is repeated. If the character string corresponds to the end of the tag, then the search expression relating to the tag is evaluated (step 1105). Then, according to the tag information, the processes in and after step 1106 are repeated.

If the referenced element does not belong to the hierarchical level of the search condition in step 1107, then the processes in and after step 1102 are repeated. Then, if the tag of the hit information corresponds to the end of the record in step 1103, then the final logical expression evaluation is performed, and it is determined whether or not the record satisfies the search condition (step 1104), and the processes in and after step 1101 are repeated. Then, if the process of all records has been completed in step 1101, the searching process terminates.

For example, when a record in a document shown in FIG. 4A is searched, the <root> tag is first detected in step 1102, and hit information 505 is output from the tag automaton shown in FIG. 5. When, in step 1106, the "Initial" element in the state management information shown in FIG. 8 is referred to, the tag name "root" points to the next "root" element, and the "root" element is accessed. Then, in step 1107, it is checked whether or not OUTPUT is added to the "root" element.

Since OUTPUT is not added to the "root" element, it is determined that the element does not belong to the hierarchical level of the search condition, and the tag searching process in step 1102 continues. Similarly, when the <comp> tag is detected, the "comp" element of the state management information is accessed. Since OUTPUT is not added to the "comp" element, the tag searching process continues.

When the <name> tag is detected next, the "name" element of the state management information is accessed. Since OUTPUT is added to the "name" element, the element is determined to belong to the hierarchical level of the search condition. Then, the value of /root/comp/name of the logical expression table shown in FIG. 10 is converted into "true", and the keyword searching process in step 1108 is performed.

Since the keyword 'ABC' is detected in the keyword searching process, the hit information 901 is output from the keyword automaton shown in FIG. 9. Then, the value of 'ABC' of the logical expression table is converted into "true". However, in step 1109, the character string does not correspond to the end of the tag. Therefore, the keyword searching process continues.

Next, the character string "</" is detected, and hit information 902 is output from the keyword automaton. Since the character string indicates the header of the end tag, it is determined to correspond to the end of the <name> tag, and the logical expression table is referred to in step 1105, and it is checked whether or not /root/comp/name='ABC' can be satisfied.

At this stage, the values of /root/comp/name and 'ABC' of the logical expression table are "true", it is determined that the logical expression is satisfied, and the corresponding value of the logical expression table is converted into "true". Thus, the document shown in FIG. 4A is a candidate for a document satisfying the search condition. At this time, the values of /root/comp/name and 'ABC' are converted into the initial value of "false".

Since the end tag has been detected, the state management information is inversely traced in step 1106. In this operation, the element "comp" immediately before the element "name" of the state management information is accessed. However, since the element does not belong to the hierarchical level of the search condition, the tag searching process continues.

When the final </root> tag is detected, it is determined that the tag corresponds to the end of a record in step 1103. Therefore, in step 1104, it is checked by referring to the logical expression table whether or not the search condition has been satisfied.

At this stage, since the value of the logical expression table /root/comp/name='ABC' is "true", it is determined that the search condition has been satisfied, and the identification information about the document shown in FIG. 4A is stored in the search result storage unit 216 as the information about the document satisfying the search condition. At this time, the value of /root/comp/name='ABC' of the logical expression table is set as "false", that is, the initial value.

The record of the document shown in FIG. 4B is similarly searched, but the element "name" of the record does not contain the keyword 'ABC'. Therefore, the search condition is not satisfied and the identification information about the document shown in FIG. 4B is not stored in the search result storage unit 216.

When the process of all records is completed, the identification information about the document stored in the search result storage unit 216 is returned to the application program 202 as a search result.

The process performed by the data read unit 215, the data synchronization unit 217, and the data write unit 218 shown in FIG. 3 is described below in detail by referring to FIGS. 12 through 18.

Figure 12:
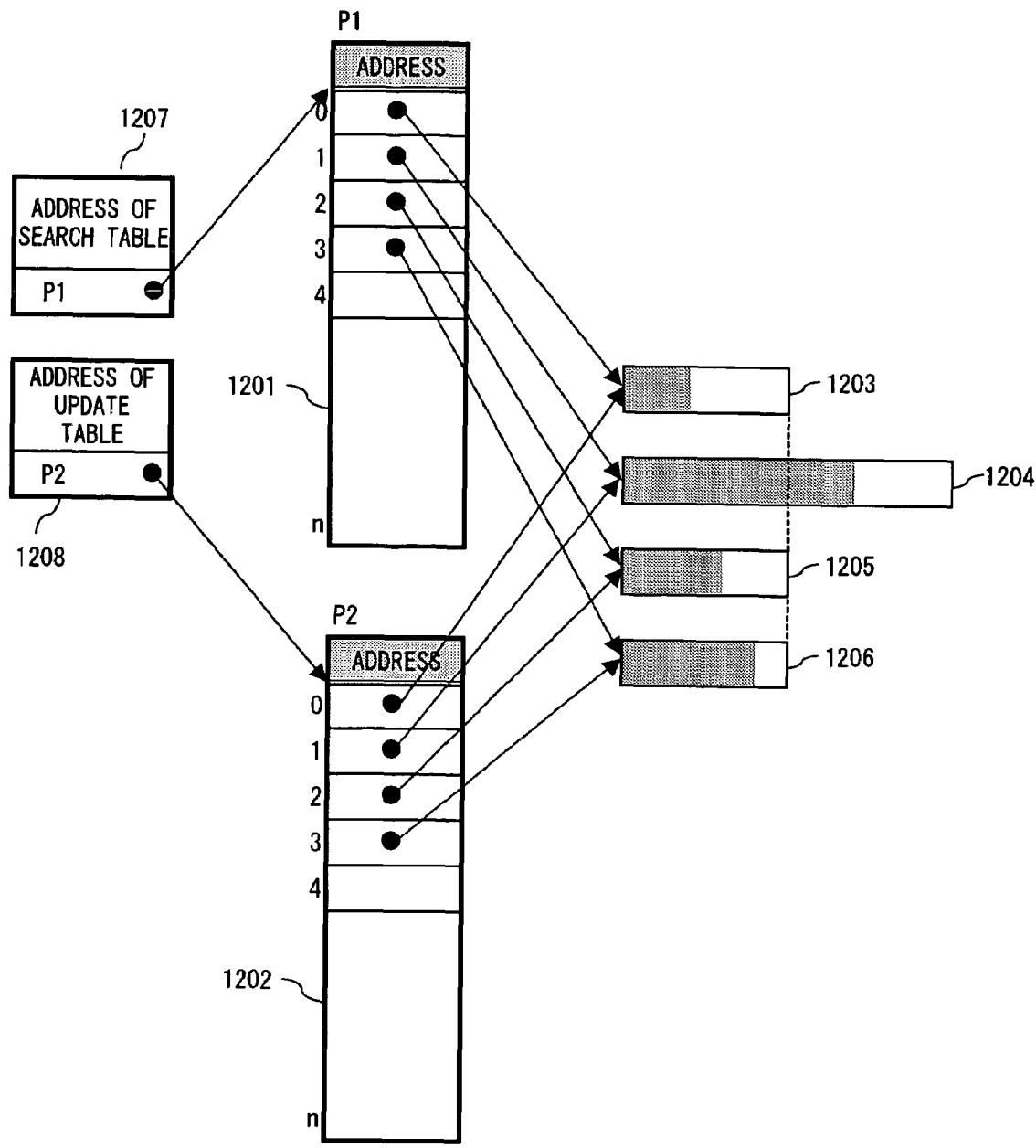
FIG. 12 shows the initial states of a search table and an update table.

The data synchronization unit 217 holds two data management tables 1201 and 1202 as shown in FIG. 12, and passes an available data management table to the data read unit 215 and the data write unit 218. The data management tables 1201 and 1202 hold the addresses of document data 1203, 1204, 1205, and 1206 stored in the data storage unit 219, and are used as index tables for access to the document data. In this example, each of the document data 1203, 1204, 1205, and 1206 is assumed to correspond to one XML document.

The data synchronization unit 217 determines a data management table for use by the data read unit 215 and the data write unit 218 by setting the address of any data management table as an address 1207 of the search table and an address 1208 of the update table. In FIG. 12, the address P1 of the data management table 1201 is set as the address 1207, and the address P2 of the data management table 1202 is set as the address 1208.

The data management table 1201 specified by the address 1207 is passed as a search table to the data read unit 215, and the data management table 1202 specified by the address 1208 is passed as an update table to the data write unit 218. The data read unit 215 reads document data from the data storage unit 219 using the received search table in the above-mentioned searching process.

Upon receipt of an addition request, an update request, a deletion request, or a batch deletion request from the operation analysis unit 211, the data write unit 218 performs an adding process, an updating process, a deleting process, or a batch deletion processing on the document data of the data storage unit 219 using the received update table. After writing the information about the process to the update table, the notification of the end of the process is issued to the data synchronization unit 217.

Upon receipt of the notification, the data synchronization unit 217 switches between the stored addresses 1207 and 1208, and the data management table 1202 which has been used as the update table is passed to the data read unit 215 as a new search table. Then, the contents of the data management table 1202 are copied to the other data management table 1201.

With the above-mentioned configuration, the data read unit 215 can read document data even during the adding process, the updating process, the deleting process, and the batch deletion processing by the data write unit 218.

Figure 13:
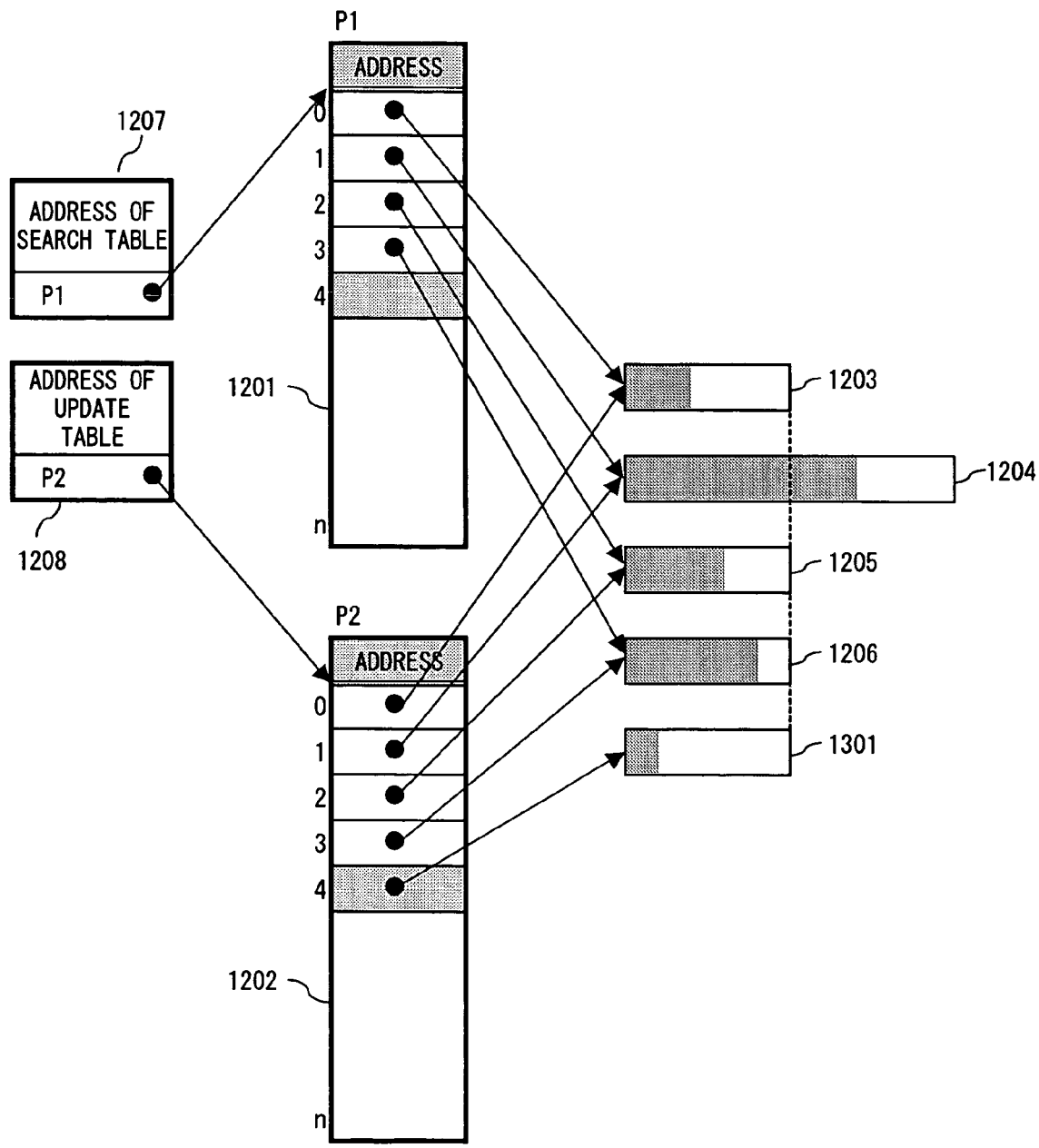
FIG. 13 shows the first procedure of an adding process.
Figure 15:
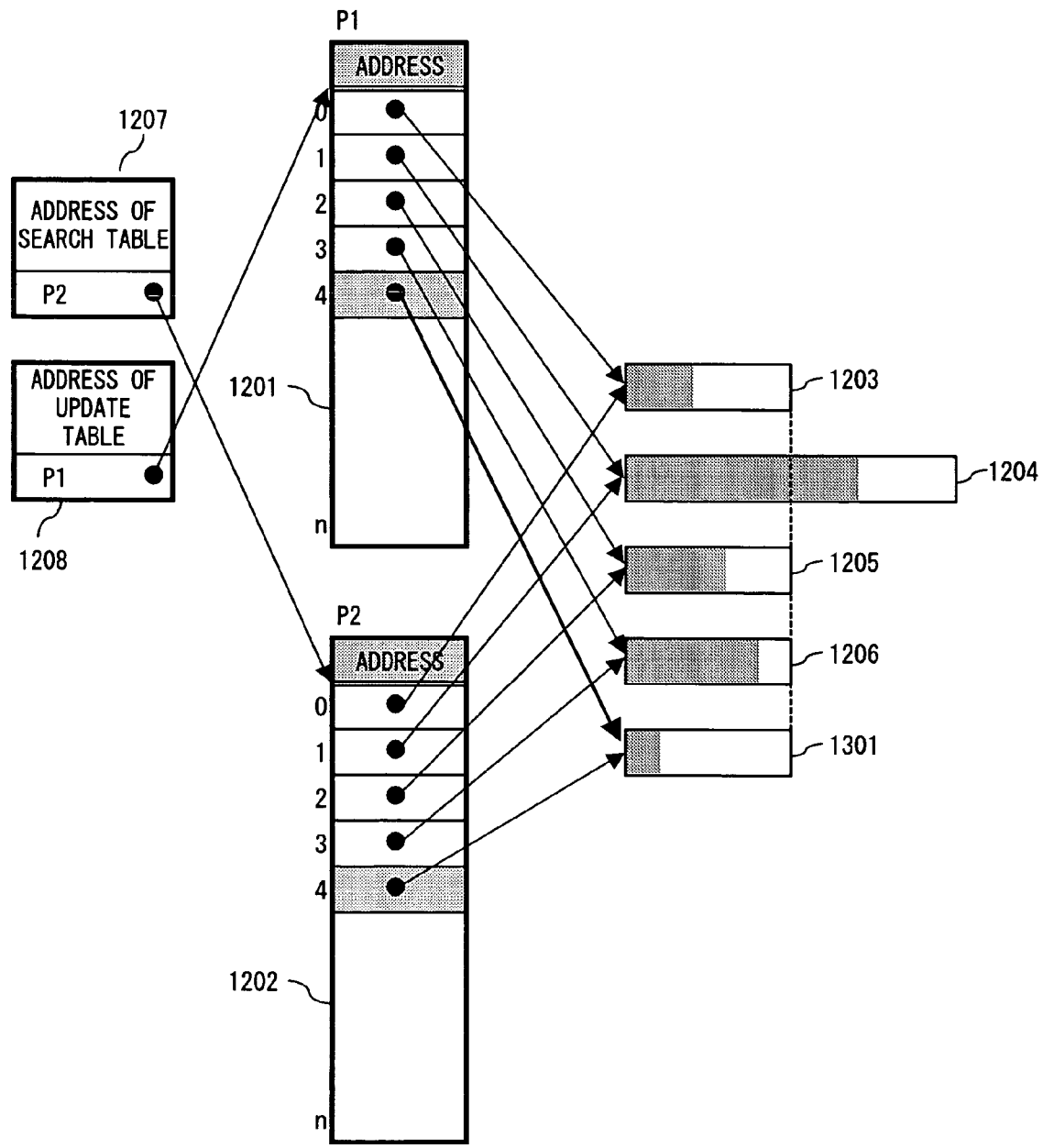
FIG. 15 shows the third procedure of an adding process.

FIGS. 13 through 15 show the procedure of the adding process of the new document data. First, as shown in FIG. 13, the data write unit 218 stores document data 1301 to be added in the data storage unit 219, and its storage address is added to the data management table 1202.

As shown in FIG. 14, the data synchronization unit 217 switches the values between the address 1207 and the address 1208. Thus, the data management table 1201 functions as an update table, and the data management table 1202 functions as a search table. As shown in FIG. 15, the contents of the data management table 1202 are copied to the data management table 1201, and the contents of the new update table are updated to the latest data.

FIG. 16 shows the updating process of the existing document data 1205. First, the data write unit 218 stores the updated document data 1601 in the data storage unit 219, and changes the address of the document data 1205 registered in the data management table 1202 into the storage address of the document data 1601. Then, in the procedure similar to those shown in FIGS. 14 and 15, the data synchronization unit 217 switches the values between the address 1207 and the address 1208, and the contents of the data management table 1202 are copied to the data management table 1201.

FIG. 17 shows the deleting process of the existing document data 1206. First, the data write unit 218 deletes the address of the document data 1206 registered in the data management table 1202. Then, in the procedure similar to those in FIGS. 14 and 15, the data synchronization unit 217 switches the values between the address 1207 and the address 1208, and the contents of the data management table 1202 are copied to the data management table 1201.

FIG. 18 shows the batch deletion processing of all document data of the data storage unit 219. First, the data write unit 218 deletes the addresses of all document data registered in the data management table 1202. Then, in the procedure similar to those in FIGS. 14 and 15, the data synchronization unit 217 switches the values between the addresses 1207 and 1208, and the contents of the data management table 1202 are copied to the data management table 1201.

In the above-mentioned embodiments, the searching process to be performed on XML documents is described, but the present invention can be applied not only to the process on XML documents, but also can be applied to the searching process on any structured documents including SGML (standard generalized markup language) documents.

In the above-mentioned embodiments, the tag automaton and the keyword automaton are used in detecting a tag and a keyword, but they can be replaced with other tag registration information and keyword registration information.

The search apparatus shown in FIG. 3 can be configured by, for example, an information processing device (computer) as shown in FIG. 19. The information processing device shown in FIG. 19 comprises a CPU (central processing unit) 1901, memory 1902, an input device 1903, an output device 1904, an external storage device 1905, a medium drive device 1906, and a network connection device 1907. They are interconnected through a bus 1908.

The memory 1902 includes, for example, ROM (read only memory), RAM (random access memory), etc., and stores a program and data used in data processing. The CPU 1901 performs necessary processes by executing a program using the memory 1902.

The search result storage unit 216 shown in FIG. 3 corresponds to the memory 1902. The operation analysis unit 211, the data search unit 212, the search expression analysis unit 213, the XML search unit 214, the data read unit 215, the data synchronization unit 217, and the data write unit 218 shown in FIG. 3 correspond to the functions realized by executing a program stored in the memory 1902. The logical expression table 221, the tag automaton 222, the state management information 223, and the keyword automaton 224 shown in FIG. 3 are dynamically generated in the memory 1902.

The input device 1903 can be, for example, a keyboard, a pointing device, a touch panel, etc., and is used by a user in inputting an instruction and information. The output device 1904 can be, for example, a display, a printer, a speaker, etc., and is used in outputting an inquiry and a process result, etc. to the user.

The external storage device 1905 can be, for example, a magnetic disk device, an optical disk device, a magneto-optical disk device, a tape device, etc. The information processing device has the external storage device 1905 store the program and data so that they can be loaded into the memory 1902 as necessary. The external storage device 1905 can also be used as the data storage unit 219 shown in FIG. 3.

The medium drive device 1906 drives a portable recording medium 1909 and accesses the recorded contents. The portable recording medium 1909 can be any computer-readable recording medium such as a memory card, a flexible disk, CD-ROM (compact disk read only memory), an optical disk, a magneto-optical disk, etc. A user can store the program and data on the portable recording medium 1909, and load them into the memory 1902 for use as necessary.

The network connection device 1907 is connected to any communications network such as a LAN (local area network), etc. for data conversion in the communications. The information processing device receives the program and data from an external device through the network connection device 1907 as necessary, and uses them after loading them into the memory 1902.

FIG. 20 shows a computer-readable recording medium capable of providing a program and data for the information processing device shown in FIG. 19. The program and data stored in the portable recording medium 1909 and a database 2003 in a server 2001 are loaded into the memory 1902 of the information processing device 2002. The server 2001 generates a propagation signal for propagating the program and data, and transmits them to the information processing device 2002 through an arbitrary transmission medium in a network. The CPU 1901 executes the program using the data, and performs a necessary process.

What is claimed is:

1. A search apparatus which searches data of a document structured using a tag based on a search condition, comprising:

a generation device analyzing the search condition and generating tag registration information including a registered character string of a tag indicating each element contained in a search path specified by the search condition, keyword registration information including a registered character string of a keyword specified by the search condition, and state management information for management of a current search state using the search path;

a read device sequentially reading document data of a structured document to be searched by a predetermined amount; and a search device searching the document data of the structured document while switching repeatedly from a tag search of detecting a tag registered in the tag registration information from among a read data string to a keyword search of detecting a keyword registered in the keyword registration information from among a read data string using the state management information and from the keyword search to the tag search, and outputting a search result, wherein the search apparatus is configured to perform:

generating the state management information containing information for management of correspondence between the current search state and an element in the search path, and information designating a state in which the tag search is to be switched into the keyword search;

referring to the state management information when the registered tag is detected by the tag search; and switching from the tag search to the keyword search when the current search state is the state in which the tag search is to be switched into the keyword search.

2. A computer-readable recording medium on which is recorded a program for a computer for searching data of a document structured using a tag based on a search condition, the program directing the computer to perform:

analyzing the search condition and generating tag registration information including a registered character string of a tag indicating each element contained in a search path specified by the search condition, keyword registration information including a registered character string of a keyword specified by the search condition, and state management information for management of a current search state using the search path;

sequentially reading document data of a structured document to be searched by a predetermined amount; and searching the document data of the structured document while switching repeatedly from a tag search of detecting a tag registered in the tag registration information from among a read data string to a keyword search of detecting a keyword registered in the keyword registration information from among a read data string using the state management information and from the keyword search to the tag search, and outputting the result;

wherein said program directs the computer to perform:

generating the state management information containing information for management of correspondence between the current search state and an element in the search path, and information designating a state in which the tag search is to be switched into the keyword search;

referring to the state management information when the registered tag is detected by the tag search; and switching from the tag search to the keyword search when the current search state is the state in which the tag search is to be switched into the keyword search.

3. The recording medium according to claim 2, wherein said program directs the computer to perform:

reading in the tag search a character string character by character from the document data of the structured document;

comparing the read character string character by character with the registered character string of the tag registered in the tag registration information;

checking the current search state by referring to the state management information when the read character string matches the registered character string of the tag;

switching from the tag search to the keyword search when the current search state is a state in which the tag search is to be switched into the keyword search;

reading in the keyword search a character string subsequent to the character string matching the registered character string of the tag;

comparing the read character string character by character with the registered character string of the keyword registered in the keyword registration information;

switching from the keyword search to the tag search when the current search state is a state in which the keyword search is to be switched to the tag search; and determining that the structured document is a candidate for a document satisfying the search condition if the read character string matches the registered character string of the keyword.

4. The recording medium according to claim 2, wherein said program directs the computer to perform an operation of at least one of adding, updating, deleting, and batch deleting on document data of structured documents while searching the document data of the structured documents, and said program directs the computer to perform a process of searching the document data of the structured documents using one of two data management tables for access to the document data of the structured documents while performing the operation on the structured documents using the other data management table.

5. A computer-readable recording medium on which is recorded a program for a computer for searching data of a document structured using a tag based on a search condition, the program directing the computer to perform:

analyzing the search condition and generating, a tag automaton including a registered character string of a tag indicating each element contained in a search path specified by the search condition, a keyword automaton including a registered character string of a keyword specified by the search condition, and state management information for management of the current search state using the search path;

sequentially reading document data of a structured document to be searched by a predetermined amount; and searching the document data of the structured document while switching repeatedly from a tag search of detecting a tag registered in the tag automaton from among a read data string to a keyword search of detecting a keyword registered in the keyword automaton from among a read data string using the state management information and from the keyword search to the tag search, and outputting a search result, wherein said program further directs the computer to perform:

generating the state management information containing information for management of correspondence between the current search state and an element in the search path, and information designating a state in which the tag search is to be switched into the keyword search;

referring to the state management information when the registered tag is detected by the tag search; and switching from the tag search to the keyword search when the current search state is the state in which the tag search is to be switched into the keyword search.

6. A searching method for searching data of a document structured using a tag based on a search condition, comprising:

analyzing the search condition and generating tag registration information including a registered character string of a tag indicating each element contained in a search path specified by the search condition, keyword registration information including a registered character string of a keyword specified by the search condition, and state management information for management of the current search state using the search path;

sequentially reading document data of a structured document to be searched by a predetermined amount; and searching the document data of the structured document while switching repeatedly from a tag search of detecting a tag registered in the tag registration information from among a read data string to a keyword search of detecting a keyword registered in the keyword registration information from among a read data string using the state management information and from the keyword search to the tag search, and outputting a search result, wherein the method further comprises performing:

generating the state management information containing information for management of correspondence between the current search state and an element in the search path, and information designating a state in which the tag search is to be switched into the keyword search;

referring to the state management information when the registered tag is detected by the tag search; and switching from the tag search to the keyword search when the current search state is the state in which the tag search is to be switched into the keyword search.

7. A search apparatus which searches data of a document structured using a tag based on a search condition, comprising:

generation means for analyzing the search condition and generating tag registration information including a registered character string of a tag indicating each element contained in a search path specified by the search condition, keyword registration information including a registered character string of a keyword specified by the search condition, and state management information for management of a current search state using the search path;

read means for sequentially reading document data of a structured document to be searched by a predetermined amount; and search means for searching the document data of the structured document while switching repeatedly from a tag search of detecting a tag registered in the tag registration information from among a read data string to a keyword search of detecting a keyword registered in the keyword registration information from among a read data string using the state management information and from the keyword search to the tag search, and outputting a search result, wherein said apparatus further comprises:

means for generating the state management information containing information for management of correspondence between the current search state and an element in the search path, and information designating a state in which the tag search is to be switched into the keyword search;

means for referring to the state management information when the registered tag is detected by the tag search; and means for switching from the tag search to the keyword search when the current search state is the state in which the tag search is to be switched into the keyword search.

* * * * *